Dec. 4, 1962 E. E. HOPKINS 3,066,395
ASSEMBLY MACHINE FOR PUSH BUTTON SWITCHES
Filed March 24, 1959 8 Sheets-Sheet 2

Inventor:
Earl E. Hopkins
by Richard L. Caslin
His Attorney

Dec. 4, 1962 E. E. HOPKINS 3,066,395
ASSEMBLY MACHINE FOR PUSH BUTTON SWITCHES
Filed March 24, 1959 8 Sheets-Sheet 3

Inventor:
Earl E. Hopkins
by Richard L Cashin
His Attorney.

Dec. 4, 1962 E. E. HOPKINS 3,066,395
ASSEMBLY MACHINE FOR PUSH BUTTON SWITCHES
Filed March 24, 1959 8 Sheets-Sheet 4

Inventor:
Earl E. Hopkins
by Richard L. Caslin
His Attorney.

Dec. 4, 1962 E. E. HOPKINS 3,066,395
ASSEMBLY MACHINE FOR PUSH BUTTON SWITCHES
Filed March 24, 1959 8 Sheets-Sheet 5

Inventor:
Earl E. Hopkins
by Richard L. Caslin

His Attorney.

Dec. 4, 1962 E. E. HOPKINS 3,066,395
ASSEMBLY MACHINE FOR PUSH BUTTON SWITCHES
Filed March 24, 1959 8 Sheets-Sheet 6

Inventor:
Earl E. Hopkins
by Richard L Caslin
His Attorney

Dec. 4, 1962　　　　　E. E. HOPKINS　　　　　3,066,395
ASSEMBLY MACHINE FOR PUSH BUTTON SWITCHES
Filed March 24, 1959　　　　　　　　　　　　　　8 Sheets-Sheet 7

Inventor:
Earl E. Hopkins
by Richard L Caslin

His Attorney.

Dec. 4, 1962   E. E. HOPKINS   3,066,395
ASSEMBLY MACHINE FOR PUSH BUTTON SWITCHES
Filed March 24, 1959   8 Sheets-Sheet 8

Inventor:
Earl E. Hopkins
by Richard L. Cashin
His Attorney

United States Patent Office 3,066,395
Patented Dec. 4, 1962

3,066,395
ASSEMBLY MACHINE FOR PUSH
BUTTON SWITCHES
Earl E. Hopkins, Schenectady, N.Y., assignor to General
Electric Company, a corporation of New York
Filed Mar. 24, 1959, Ser. No. 801,525
11 Claims. (Cl. 29—203)

The present invention relates to an assembly machine for use in the manufacture of electrical switches of the multiple push button type as disclosed in the Hutt Patent No. 2,819,356, which is assigned to the same assignee as is the present invention. The machine of this invention is not designed to assemble a complete push button switch. It is designed merely to assemble the push rods in the switch base and to hold the rods in place by fastening a cap or button to each rod. The other elements of the switch such as the movable and fixed contacts and the many types of contact terminals vary so greatly that it is impractical to develop an automatic assembly machine for these other operations.

Multiple push button switches have been used in large numbers since they were pioneered by the Andrews Patent No. 2,431,904, which is also assigned to the present assignee. Probably the greatest use for these switches has been in electric ranges, but in recent years they have been incorporated in electric rotisseries, residential and commerical air conditioning equipment and automatic washing and/or drying units. For over a decade these switches have been assembled by hand using bench jigs and presses for performing the various fastening operations. Many improvements have been made over the years in the switch design to pare down the ever-increasing cost and retain the switch in a competitive position. However, as labor and other fixed charges are raised by an inflationary economy, it has become increasingly difficult to hold the price line. This type of situation invariably brings up the consideration of automation. The present invention is the result of several years of research and development of an automatic assembly machine for attaching the push rods in the switch bases and applying the caps to the rods.

The type of push button switch that is to be processed by this invention comprises a recessed base of molded insulating material with a top wall, elongated side walls, end walls and an open bottom wall that is adapted to be closed by a thin insulating plate. The top wall includes a series of parallel openings for receiving the push rods. Each push rod is a thin metal strip with an enlarged innermost end for engaging one or more of a plurality of movable sliders that serve as the switch actuators and control the opening and closing of the movable contacts. The enlarged end of the push rod also serves to prevent the rod from being removed through the opening in the top wall of the switch base. The outermost end of each push rod has spring fingers for mating engagement within a recessed cap.

The purpose of this machine of the present invention is to send a close file of switch bases through an assembly area of the machine, while transversely of the line of movement of the bases will be fed a plurality of files of push rods and a like number of files of the caps for the push rods. The push rods will approach the base in the assembly area above the recessed side of the base, while the caps will be fed under the opposite side of the base. A vertically reciprocating carrier is also arranged in the assembly area above the file of bases. The push rods will be loaded onto the carrier and the carrier will move toward the base and thrust the push rods through the aligned openings in one wall of the base until the rods enter the caps that underlie the base and become engaged therewith. At this point the carrier will release the push rods and return to its normal raised position while the completed base in the assembly area will be pushed to the side as the unassembled bases move up one position.

The machine of this invention also incorporates a classification center for tumbling the caps until they all stand upright so that they may be fed in multiple files into the assembly area of the machine in the proper relationship with respect to the switch base and the push rods. Moreover, there is an apparatus for orienting and feeding the push rods in multiple files so that they all are in the same relative position for being loaded onto the carrier.

The principal object of this invention is to provide an automatic assembly machine for the push rods and caps of a multiple push button switch.

A further object of the present invention is to provide an automatic machine for assembling a plurality of push rods in a switch base and in turn attaching caps to the outer ends of the rods.

A further object of the present invention is to provide an automatic assembly machine with a carrier having means for gripping the push rods and inserting them through openings in the switch base and into mating engagement with the caps.

A still further object of the present invention is to provide an automatic assembly machine of the class described with a classification center for tumbling the caps until they all stand upright before being fed into the assembly area of the machine.

A further object of the present invention is to provide an apparatus for orienting the push rods so that they likewise may be fed in close file into the assembly area where they will be loaded onto the carrier and driven through the switch base and into mating engagement with the caps.

A further object of the present invention is to provide a novel feeding mechanism for advancing the switch bases through the machine.

My invention will be better understood from the following description taken in connection with the accompanying drawings and its scope will be pointed out in the appended claims.

FIGURE 1 is a perspective view of the entire assembly machine embodying the present invention showing the unassembled switch bases moving down an incline at the left toward the assembly area of the machine, while a vertically reciprocating carrier is shown in a lowered position after a series of push rods have been forced through the openings in the switch base and into mating engagement with the underlying caps.

Figure 1:
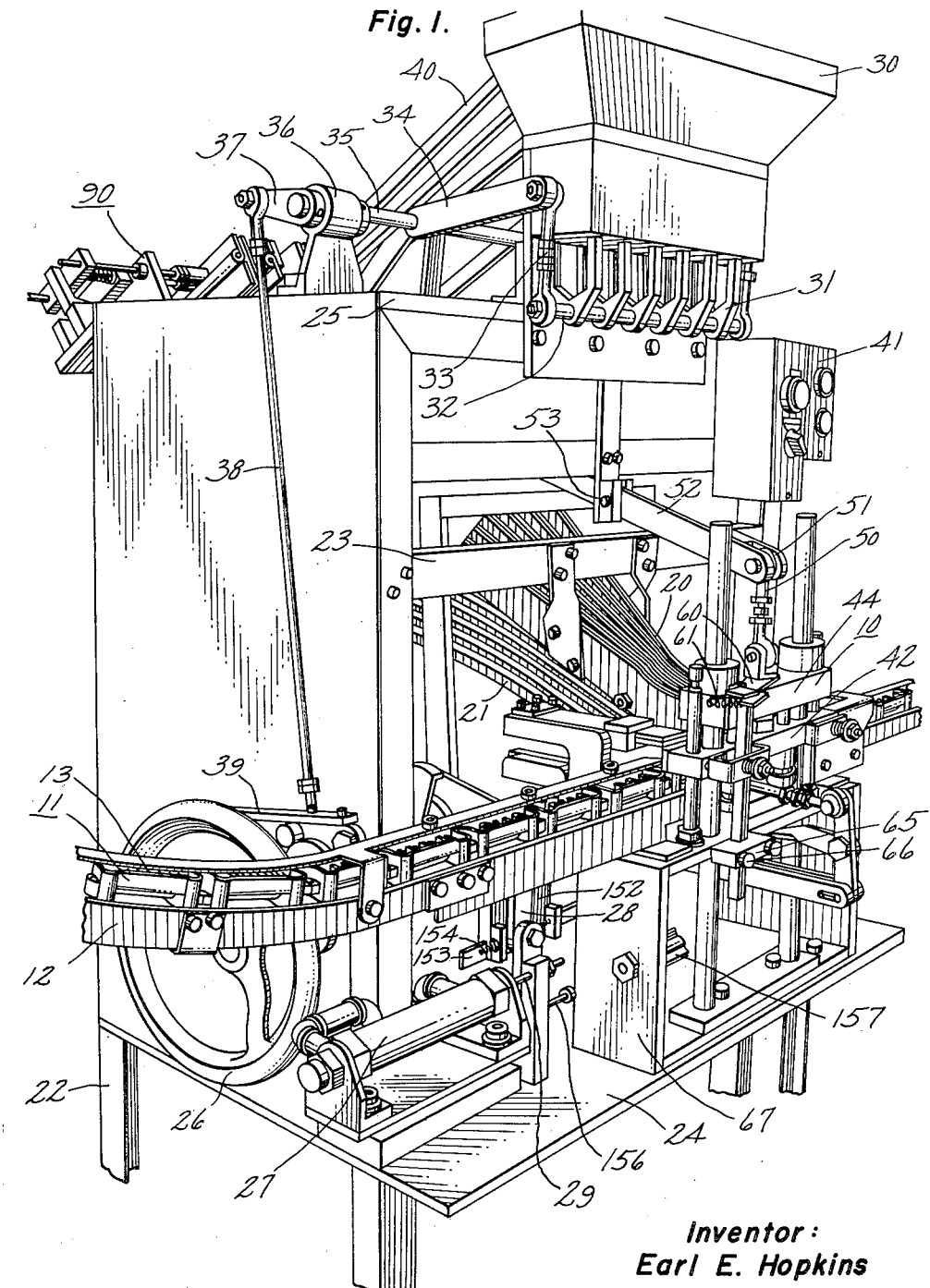
Figure 14:
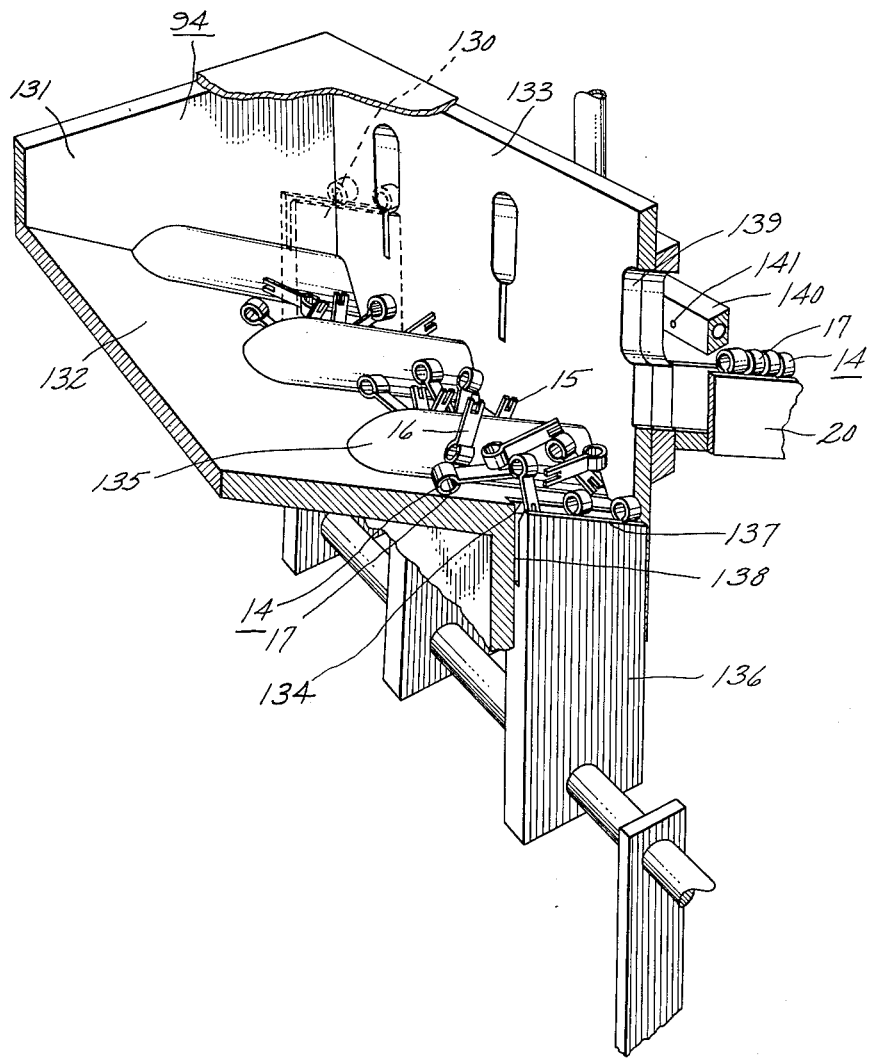
FIGURE 14 is an isometric view partly in cross-section of the apparatus for orienting the pushrods so that they may be fed by gravity into the assembly area.

Referring in detail to the drawing and in particular to the perspective view of FIGURE 1, the assembly area is at the lower front of the machine and is designated by the numeral 10. From the upper left side of the machine a stream of switch bases 11 in single file will slide down a track 12 and be fed through the assembly area 10. Attention is called to the fact that the switch bases 11 are recessed and have an open bottom wall 13. The bases are turned upside down so that the open wall faces upwardly. Looking at FIGURE 4, a recessed base 11 is shown clamped in the assembly area 10 by a slide member 80 shown with one of a pair of clamping fingers 82. (See also FIG. 2.) The bottom or open end 13 of the recessed base faces upwardly so that a push rod 14 may be inserted into the base from above and through one of the narrow openings 18, of which there are six, in the top wall of the inverted base. The push rods 14, as best seen in FIGURE 14, are formed of thin metal strip material. Each rod has a bifurcated outer end 15, a shank portion 16 and a rounded inner end 17.

It should be understood that the switch under consideration is a multiple push button switch that might have between three and ten push rods. Accordingly, this machine is in effect a multiple machine that performs a plurality of similar operations simultaneously. For instance, if the machine is designed to assemble a six button switch, the machine is actually six machines in one performing six series of operations in parallel or simultaneously. The bifurcated end 15 of the push rod is fed first through the opening 18 in the switch base so that the rounded end 17 of the rod will remain within the base for cooperation with movable sliders (not shown) that control the positions of the various movable contacts of the switch. The purpose of bifurcating the end 15 of the push rod is so that it may be fastened into a recessed cap of plastic material. The cap is shown as element 19 in FIGURE 4. There is a cap disposed beneath each of the six narrow slots 18 in the switch base so that each slot will receive a push rod 14 and the rod will be fastened within a cap 19. The rods are carried to the assembly area by a series of slides 20, each formed of two parallel plates that receive the shanks of the rods therebetween and support them by engaging the enlarged ends 17. The recessed caps 19 are fed by gravity under the base 11 and move through a series of tubes 21 in close file from the back of the machine. Looking again at FIGURE 1, there are six slides 20 feeding the push rods into the assembly area 10 of the machine as well as six tubes 21 feeding the caps under the switch base 11 in the assembly area.

Before going into detail about the individual mechanisms of this machine, reference will be made to some of the lesser elements as they would appear to an observer studying the machine shown in FIGURE 1. The machine has a framework that consists mainly of supporting angle irons 22, cross braces 23, a lower shelf 24 and a top plate 25. Most of the equipment of the machine is supported from the lower shelf 24. This includes the electric motor for driving the camshaft that supports the necessary cams, clutches, flexible couplings, etc., which are not shown in order to simplify the illustration of the invention. A hand wheel 26 at the left side of the machine is mounted on the end of the camshaft so that the shaft may be turned by hand in the event the machine becomes jammed by a broken or bent part which must be removed before the machine is started again. An air cylinder 27 is arranged under the track 12 on which the bases slide. A bell crank lever 28 is supported on a sliding frame and is operated by a piston rod 29 of the cylinder. The lever is retractible and it cooperates with the track 12 to serve as a positive feed of the bases through the assembly area 10. This feed mechanism will be discussed below in more detail with particular reference to FIGURE 15.

At the top front of the machine is a large hopper 30 which contains a supply of the recessed caps 19 in no particular order. The bottom of the hopper 30 includes a series of six plungers 31 that are carried on a common bar 32 which is in turn supported at each end from hangers 33. The hangers are pivotally supported on rocker arms 34 that are fastened to a second shaft 35. This shaft 35 is caused to oscillate in its bearings 36 by a crank arm 37 and connecting rod 38 that has a cam follower 39 at its end cooperating with a double-throw cam mounted on the camshaft of the machine. Accordingly, for each revolution of the camshaft the plungers 31 of the hopper will reciprocate twice in the hopper for feeding the caps 19 into a series of six inclined tubes 40 that lead away from the hopper. An electrical control panel 41 with the usual Start and Stop buttons is mounted at the right side of the front of the machine for easy access to the operator. The operator has the option of either automatic control or hand control; i.e., the operator pushes the "start" button for each cycle of the machine.

*Assembly of the Push Rods*

Figure 4:
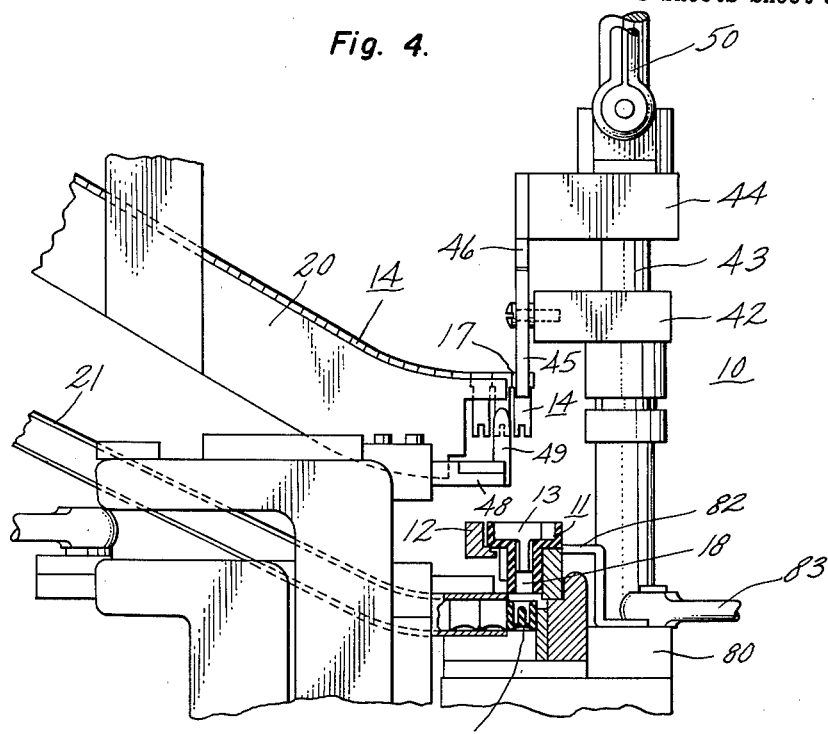
FIGURE 4 is a left side view of the assembly area of the machine showing the carrier gripping a push rod just before the carrier is to be lowered to drive the rod through the switch base and into mating engagement with an underlying cap.

FIGURE 4 is a left side view showing the switch base 11 in cross-section taken on a plane through the center of the assembly area. This view is diagrammatic and shows the assembly of but one push rod and cap in the base but it should be understood that the same arrangement is duplicated as many times as there are rods to be assembled in a single base. Actually the machine is set up to assemble six push rods in the base, although that number can be varied. As mentioned previously, the push rods move down by gravity within the slide 20. The rods are designed to be loaded onto the carrier 42 which is guided for reciprocating vertical movement on a pair of upright posts 43. There is also an upper bar 44 that is supported from the same posts 43. The bar 44 serves as a pushing and pulling means for moving the carrier 42 in both up and down directions, as will be better understood hereinafter. It is necessary to know, however, that there is a slight amount of lost motion between the upper bar 44 and the carrier 42 in both directions of movement. By this is meant that the upper bar 44 will move downward a slight amount first and then the carrier 42 will be forced to move along with it. The reverse is also true. The bar 44 will move upwardly a slight amount before the carrier 42 is caused to move.

Figure 6:
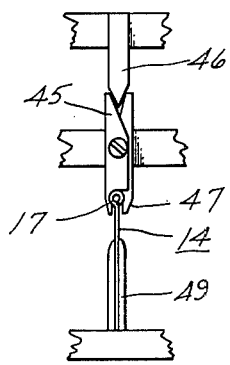
FIGURE 6 is a detailed showing of the method of closing the tongs of the carrier so that they will grip the push rods and be able to drive the rods through the switch base.

The back of the carrier 42 carries a plurality of tongs 45, as best seen in FIGURE 6 which operate in a manner of clothes pins except that the jaws of the tongs are biased open by an internal spring (not shown) rather than closed. Accordingly, the tongs are normally in a position to receive the rounded end 17 of the push rod 14. To close the tongs a wedge member 46 is positioned at the back of the upper bar 44. Hence, the first move is for the upper bar 44 to be lowered, thereby forcing the wedge 46 between the fingers of the tongs 45 and closing the jaws 47 over the rounded end 17 of the push rod, as best seen in FIGURE 6. Once the rod is clamped between the jaws of the tongs, the carrier 42 will be pushed ahead of the upper bar 44 to move downwardly in unison and thread the rod 14 through the opening 18 in the base 13 and into mating engagement with the recessed cap 19.

Figure 5:
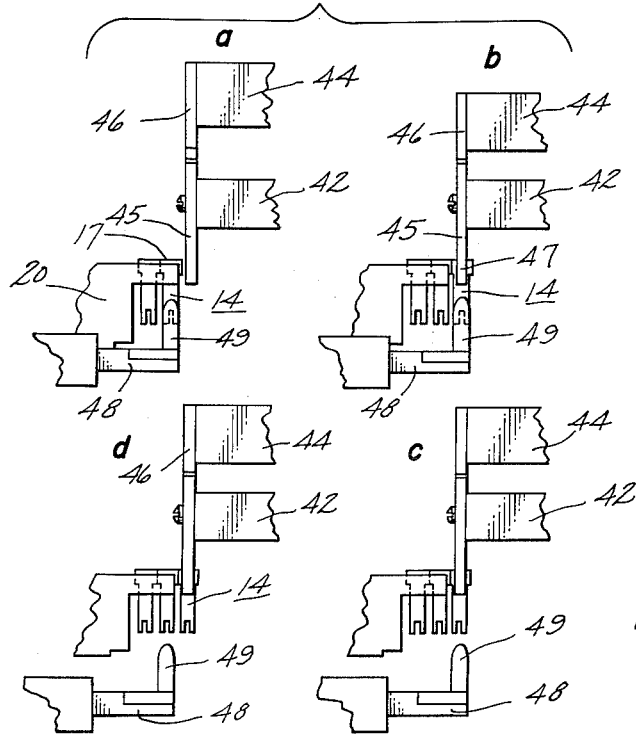
FIGURE 5 is a composite of four progressive views arranged in clockwise fashion to show the various steps of the method of feeding the push rods into the gripping means of the carrier; the separate views being labeled "a," "b," "c" and "d."

There must be a positive feed for transferring the rods 14 from the track 20 into the waiting jaws of the tongs 45. Otherwise the rods might interfere with the vertical movement of the carrier as the rods are driven through the switch base. Such a positive feed is exemplified by plunger 48 that carries at its end a vertical finger 49 with a tip that engages the bifurcated end 15 of the rod so that it is able to carry the rod into the open jaws 47 of the tongs 45. The plunger 48 is not only capable of reciprocating back and forth but it is also capable of vertical movement, as seen in FIGURE 5. This FIGURE 5 is divided into four progressive showings of the various positions of the plunger 48 and finger piece 49. These four positions labeled "a," "b," "c," and "d," illustrate the clockwise movement of the plunger as it would be seen from the left side of the machine. The starting position, labeled "a," shows the finger piece 49 engaging the bifurcated end of the first push rod 14. The tongs 45 are open to receive the rounded end 17 of the rod. Notice that the wedge 46 of the upper bar is raised. This, of course, explains the open position of the tongs. In the next step, labeled "b," the plunger 48 and finger piece 49 have moved to the right, thereby positioning a push rod 14 between the jaws 47 of the tongs. Once the push rod 14 is in place, the upper bar 44 will be lowered to drive the wedge 46 between the fingers of the tongs, thereby closing the jaws 47 around the rod end 17. In the next step, labeled "c," the plunger 48 has been lowered, thereby disengaging the finger piece 49 from the push rod. Then the plunger is moved back to the left, as seen in "d," to underlie the second push rod 14 to complete its cycle of movement.

*Action of the Carrier*

Having explained the motion of the carrier 42 and its manner of gripping the push rods and inserting them through the switch base, it is well to consider the means of controlling or operating the carrier. Attention is directed to FIGURES 1–4 for an understanding of the mechanism now to be explained. In FIGURE 1, the upper bar 44 is joined at its center to a connecting rod 50 which is pivotally supported at its opposite end 51 to one end of a rocker arm 52. This rocker arm is in turn pivoted near its center, as at 53, for a rocking motion to act as a vertically reciprocating drive for the carrier 42 and its related bar 44.

Figure 2:
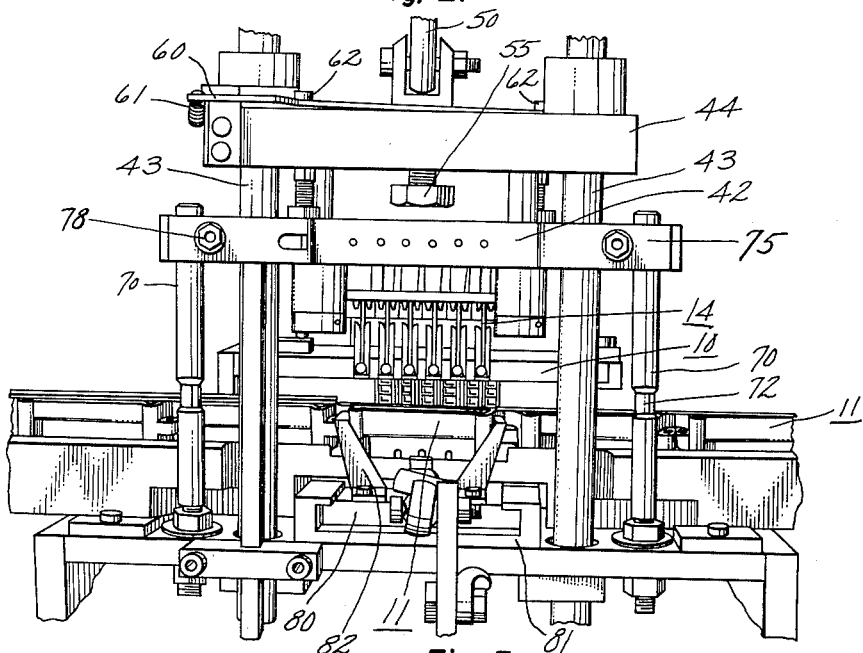
FIGURE 2 is a front view of the assembly area showing the carrier in the uppermost position and an unassembled switch base clamped in place waiting to receive the downward thrust of the carrier which drives the push rods through the base.
Figure 3:
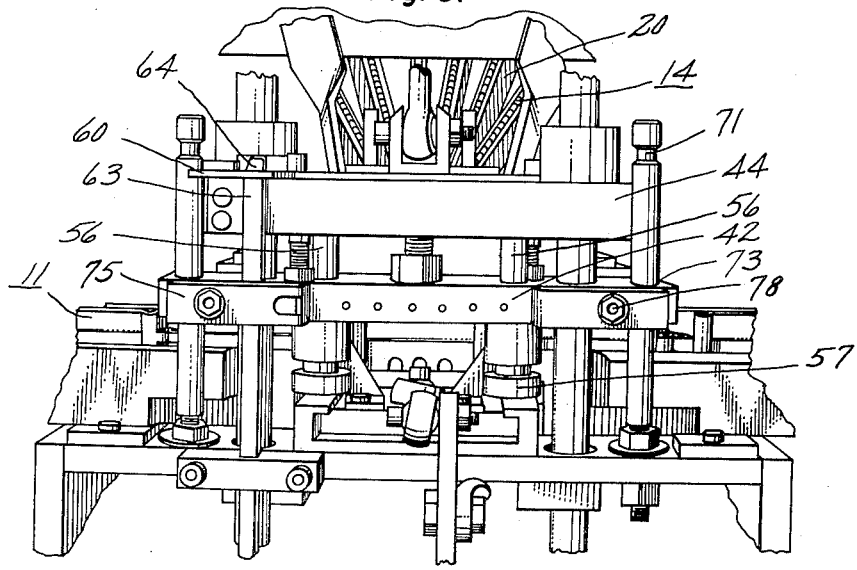
FIGURE 3 is a front view similar to that of FIGURE 2 after the carrier has moved to its lowermost position.

Now turning to the raised and lowered positions of the carrier of FIGURES 2 and 3 respectively, attention is drawn to the fact that both the carrier 42 and the upper bar 44 are supported and guided by the pair of vertical posts 43. The upper bar 44 includes a downwardly extending bumper 55 in the form of a large bolt screwed into the underside of the bar. In the raised position of the carrier of FIGURE 2, the bumper 55 is spaced from the carrier 42. This space represents the lost motion between the carrier and upper bar as the bar is driven down by the connecting rod 50. This lost motion is as explained previously regarding FIGURE 5 and the manner in which the wedge 46 closes the jaws 47 of the tongs 45 so as to clamp the push rod prior to the descent of the rods through the switch base.

FIGURE 3 shows the carrier and upper bar 44 in their lowermost position; that is, after the push rods have been assembled through the switch base and into mating engagement with the recessed caps. There is also lost motion between the carrier 42 and upper bar 44 as the bar moves upwardly. This is necessary to first withdraw the wedges 46 from engagement with the tongs 45 so as to open the jaws of the tongs and disengage the carrier from the push rods. After this is done, both the upper bar 44 and carrier 42 move together. Such an action is provided by a pair of rods 56 which are fixed to the underside of the upper bar 44 and extend through the carrier for a sliding engagement therewith. The lower ends 57 of the rods 56 are enlarged to form a collar so that as the upper bar 44 is raised, the weight of the carrier 42 will be borne by the collars 57.

It is important to lock the carrier 42 together with the upper bar 44 once the bumper 55 of the bar engages the carrier. This locking action is provided by a latch member 60 which rests on the top of the bar 44 and is pivotally supported at its center to move in a horizontal plane. A coil spring 61, as seen in FIGURE 1, normally biases the latch against an upright bolt 62. There is such a bolt 62 acting against each end of the latch 60. These bolts are made integral with the carrier 42 and extend upwardly through the upper bar 44 and are in sliding engagement therewith. As the upper bar 44 moves down toward the carrier and engages the carrier, the latch member will move into a slot (not shown) in the side of each bolt member 62 and will be caught therein so that the upper bar 44 may not move away from the carrier until the latch has been released.

As best seen in FIGURE 3, the release of the latch 60 from the bolt member 62 is effected by a releasing rod 63 with a pointed end 64 that engages behind the latch member 60 when the upper bar and carrier are in their lowermost position. The release member 63 will cam the latch 60 open, thereby allowing the upper bar 44 to move away from the carrier 42. In so doing, the upper bar will lift its wedges 46 out of engagement with the tongs that grip the push rods. This releases the carrier from the push rods so that the carrier may return to its uppermost position. As best seen in FIGURE 1, the release member 63 is supported adjacent its lower end by an encircling clamp 65 that is fastened by bolts 66 to a part 67 of the machine framework.

Means are also provided for temporarily clamping the carrier 42 in both its upper and lowermost positions until the upper bar 44 moves into direct driving engagement with the carrier. Such a clamping arrangement may be best understood with relation to FIGURES 2 and 3. On the outside of each upright post 43 is a vertical stud 70. Each stud has an upper and a lower reduced neck or annular groove 71 and 72 respectively. Each stud fits into an opening 73 in the carrier so that the carrier may slide on the studs. The carrier contains a pair of spring biased detent pins 74 (FIG. 7) which are diametrically opposed to each other and enter the opening 73 for locking engagement within the grooves 71 and 72. These detent pins become engaged in the grooves 71 and 72 and hold the carrier against accidental or inadvertent movement during the lost motion periods. The spring pressure for each detent pin is provided by a plate member 75 that is fulcrummed about one end 76 and engages the plunger 74 at its opposite end 77 to act in the manner of a third-class lever. A bolt 78 extends outwardly from the carrier and through the plate member so that a coil spring 79 may slide over the bolt and be locked thereon to press against the plate member.

Figure 7:
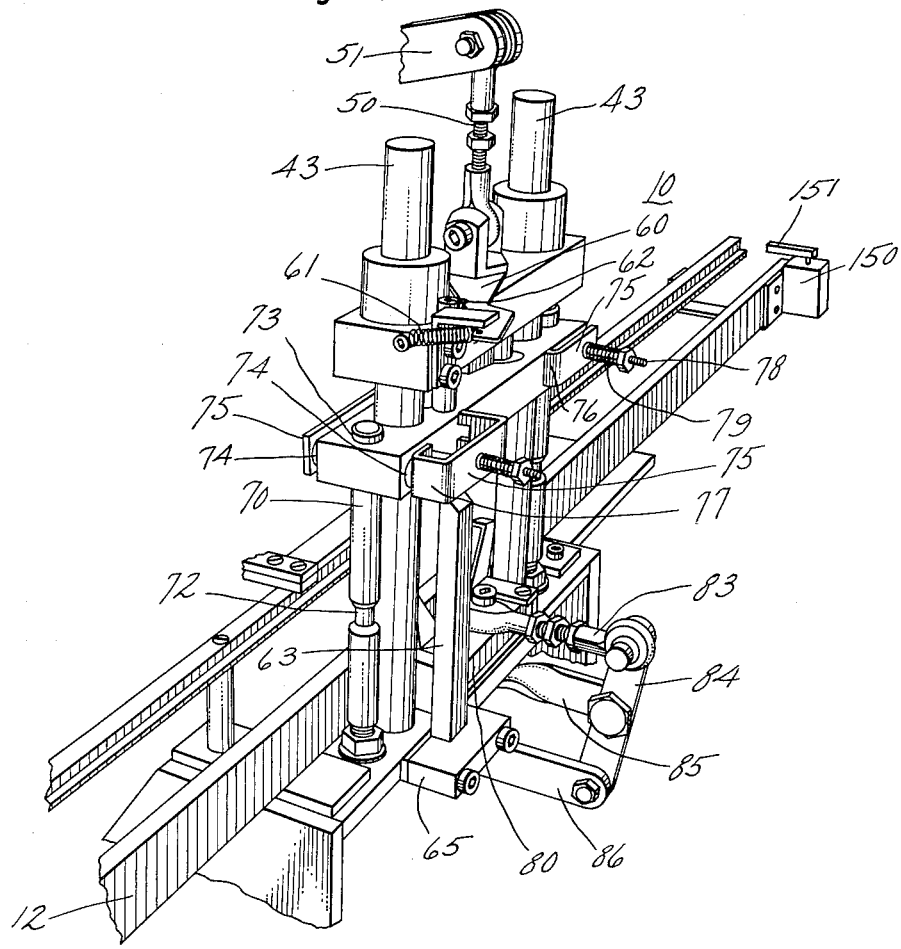
FIGURE 7 is an isometric view of the assembly area of the machine taken from the left side and showing the carrier in its uppermost position similarly to FIGURE 2.

As best seen in FIGURES 2 and 7, there is a slide member 80 that moves within a channel runway 81 and is adapted to slide in and out for clamping and releasing a switch base 11 within the assembly area 10. The slide member 80 contains a pair of parallel fingers 82 which engage the opposite ends of the switch base and accurately position the base over the recessed caps and under the push rods 14. Looking at FIGURE 7, the slide member 80 is shown connected by a link 83 to one end of a short rocker arm 84 that is pivotally mounted at its center to a fixed bar 85. The rocker arm is motivated by a suitable bar 86 that is driven off of the camshaft of the machine.

Figure 8:
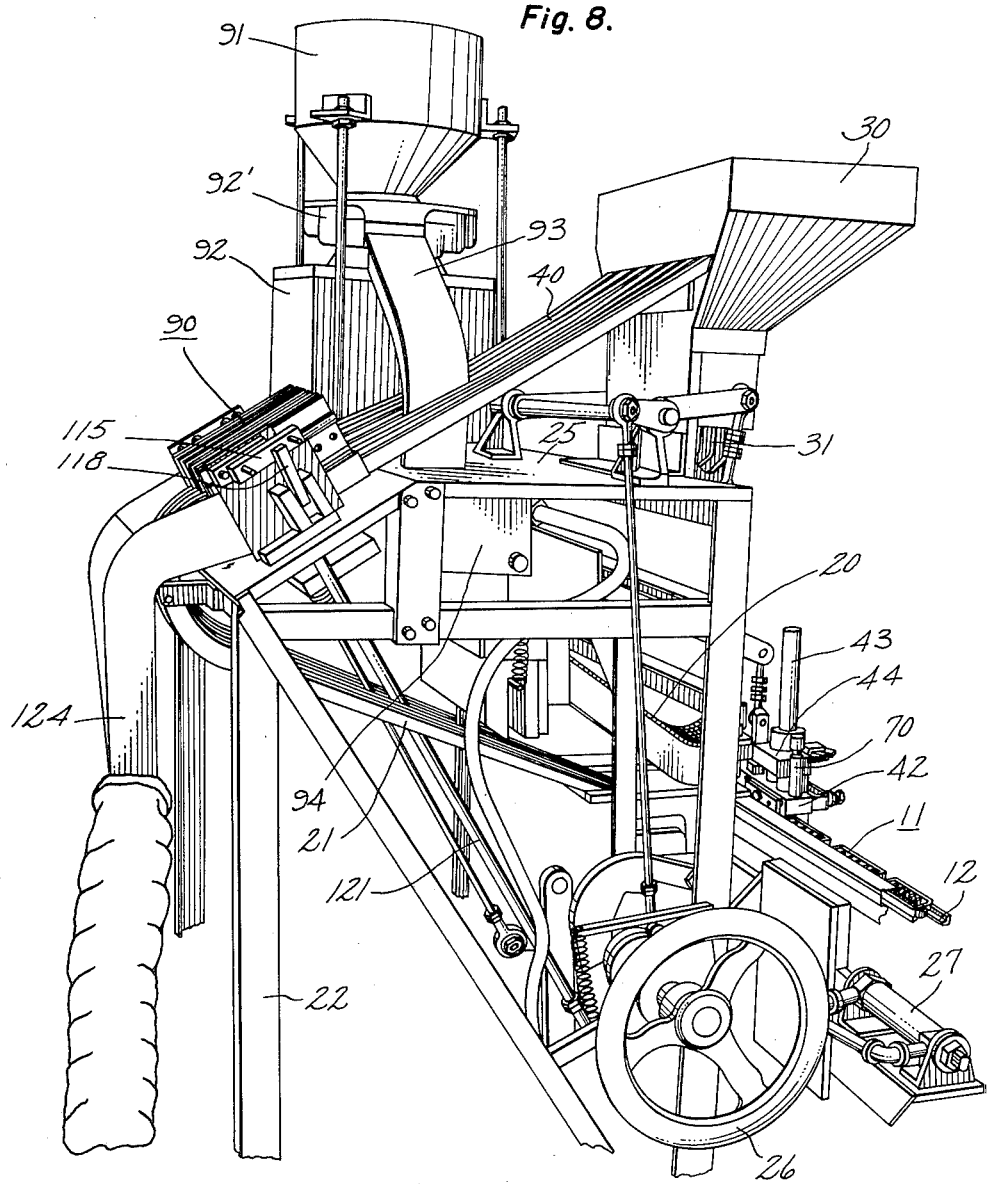
FIGURE 8 is a left side elevational view taken from a point near the back of the machine showing the spatial relation of the hopper for feeding the caps into the classification center.

FIGURE 8 shows a left side view of the machine in perspective with the side plate of the machine removed to gain a better knowledge of the two systems for feeding and orienting the recessed caps and the push rods so that they may be fed automatically into the assembly area. As mentioned previously, there is a hopper 30 above the front of the machine which contains a large supply of caps. The caps are agitated within the bin by a series of six plungers 31 which reciprocate in vertical planes and are capable of loading the caps into the six tubes 40 that are inclined downwardly toward the back of the machine to discharge into a classification center 90. Moreover, there are six tubes 21 which receive the caps from the classification center and allow them to slide by gravity under the switch base 11 in the assembly area as depicted in FIGURE 4.

Before describing in detail the construction of the classification center 90 as illustrated in FIGURES 9–13, mention will be made of the system for feeding the push rods at a controlled rate to the apparatus 94 of FIGURE 14 for orienting the push rods. It should be understood that this vibratory hopper does not form part of the present invention. Above the right side of the machine is a cylindrical hopper 91 containing the push rods. This hopper is supported above a vibration unit 92 that includes a tub 92' that vibrates at a high frequency. A spiral track (not shown) extends along the interior wall of the tub and turns at a slow rate of speed. The rotating track picks up the push rods which are set in motion by the vibration of the tub and carries them up the track until they are spilled at a predetermined rate into a large chute 93 that in turn empties into the apparatus 94.

Classification Center

Figure 11:
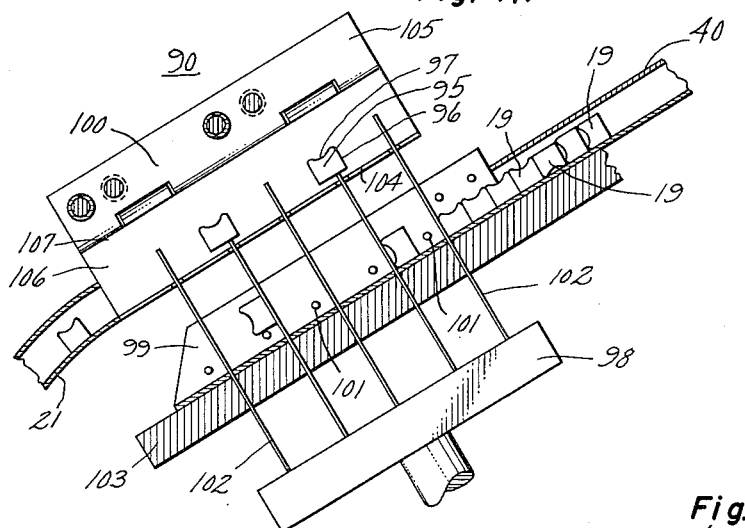
FIGURE 11 is a diagrammatic showing of the classification center for the caps illustrating how the movable jaws of the expansible chute strip the caps from the tines of the fork member that serves to tumble the caps if they are not in an upright position.
Figure 12:
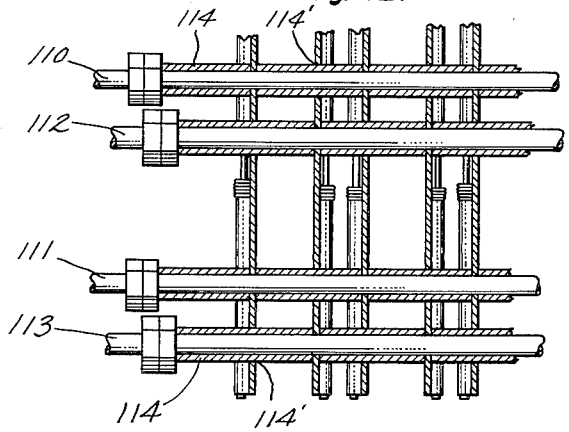
FIGURE 12 is a detail showing of the method of clamping and sliding the movable jaws of the classification center of FIGURES 9 and 10.

Consideration will now be given to the classification center 90 as it is shown in FIGURE 11. Previous mention has been made of the inclined tubes 40 which lead from the hopper 30 and feed the caps into the classification center 90. The caps are of molded plastic material and are generally in the shape of a prism with opposed side walls 95, opposed end walls 96 and a slightly concave top wall 97. Opposite the top wall 97 is an opening leading into the recess within the cap. As the caps 19 slide down the tube 40, they are not arranged in any particular order, which explains the necessity for the classification center 90. The caps must be rearranged so that they all stand upright and may be fed properly into the assembly area. The classification center comprises three main elements, namely, the fork member 98, a trough 99 and an expansible chute 100. The trough 99 includes a series of transverse pins 101 which serve as hurdles for the caps 19. The fork member 98 includes a number of tines 102 which cooperate with the pin hurdles 101. First, the fork member is lowered so that the tines 102 disappear within the supporting portion 103 of the trough 99. In so doing, the caps 19 within the tube 40 will slide against the first pin hurdle 101. Then when the fork member is raised, the first tine at the right-hand side will strike the cap. If the first cap is resting topside up, the first tine will engage within the cap and lift it out of the trough. If the cap is resting on an end wall 96 or the concave top wall 97, the tine will tumble the cap over the hurdle 101. Then when the fork member is lowered again, the tumbled cap will move against the second pin 101. This gives the fork member another chance to raise the cap if it is standing topside up. If it is not, the cap will be tumbled again. Hence, the five tines of the fork member 98 represent five opportunities for setting the caps topside up so that they may be raised out of the trough and into the expansible chute 100.

The expansible chute 100 comprises a pair of movable jaws which are capable of moving toward and away from each other. When the jaws are opened, the fork member 98 may be raised to lift one or more of the upright caps out of the trough. The jaws have an inwardly turned flange 104 at the lower edge of each so that when the jaws are closed the flanges will underlie the caps. Then when the fork member is lowered again, the caps will be stripped from the tines by the flanges. Since these flanges 104 are also inclined, the caps will slide by gravity into the tubes 21 and finally into the assembly area 10.

Safety means are provided for the expansible chutes 100 so that the movable jaws will not crush one of the caps 19 in the event that a cap might have turned on its tine transversely of the chute. The movable jaws may be identified as 105 with a lower spring biased section 106 that pivots about a hinge axis 107. In the event that one of the caps might have turned sideways, the pivoted portion 106 of the jaw would merely spring open and would tend to resiliently engage that cap and prevent it from moving toward the tube 21. Later, when the movable jaws are spread apart, the cap would merely fall out of the way and be discarded, or it might be returned to the hopper 30.

Figure 9:
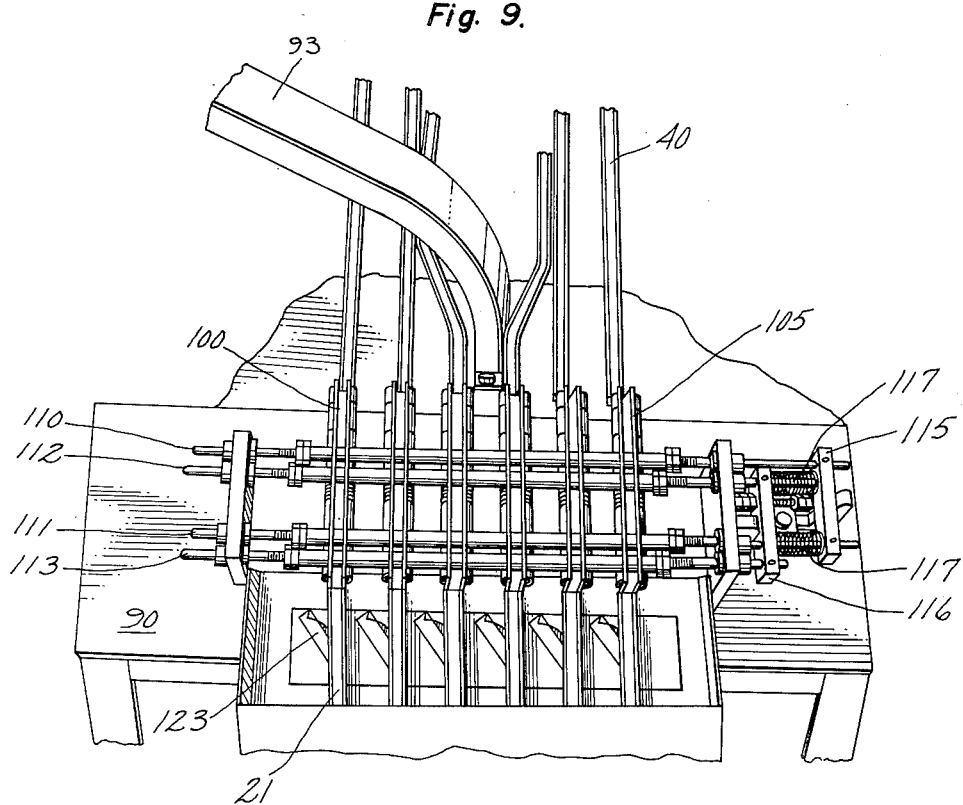
FIGURE 9 is a plan view of the classification center for the caps showing the movable jaws of the expansible chutes in the closed position for stripping the caps off of the tines of the fork members that have set the caps upright.
Figure 10:
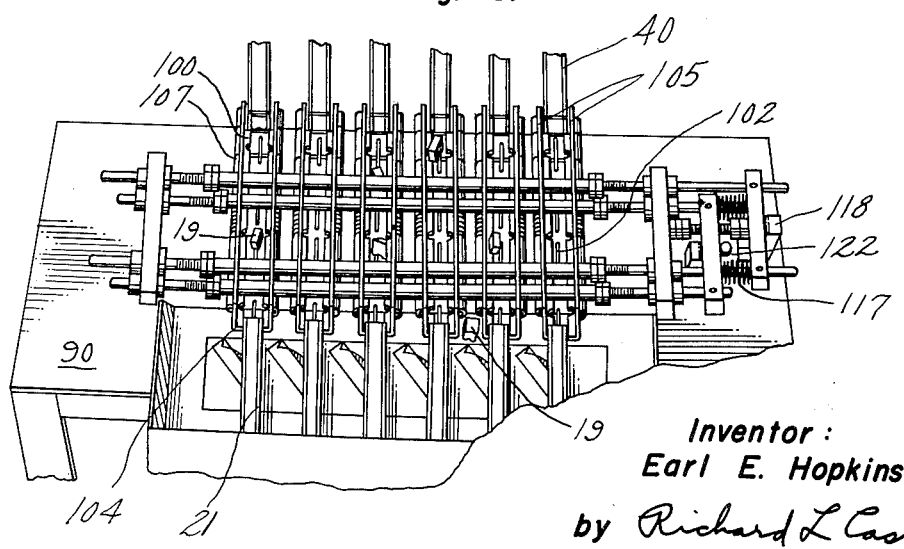
FIGURE 10 is a view similar to that of FIGURE 9 with the movable jaws in the open position so that the fork members may be raised to extend into the chutes.

FIGURES 9 and 10 show plan views of the six expansible chutes 100. The chutes are closed in FIGURE 9 and opened in FIGURE 10. As mentioned previously, each expansible chute 100 comprises a pair of movable jaws 105. In the plan views of FIGURES 9, 10 and 12, the left-hand jaws are mounted on rods 110 and 111 while the right-hand jaws are mounted on rods 112 and 113. All of the rods contain a plurality of tubular spacers 114 which are used to engage the jaws and hold them rigid on one pair of rods while moving them with respect to the other pair. Looking at FIGURE 12, it is clear that the tubular spacers 114 on rods 110 and 111 abut the opposite sides of the left-hand jaws 105, while they extend completely through an opening 114' in the right-hand jaws. The reverse is true on the other pair of rods 112 and 113. There the spacers 114 extend through openings 114' in the left-hand jaws and abut the opposite sides of the right-hand jaws.

Figure 13:
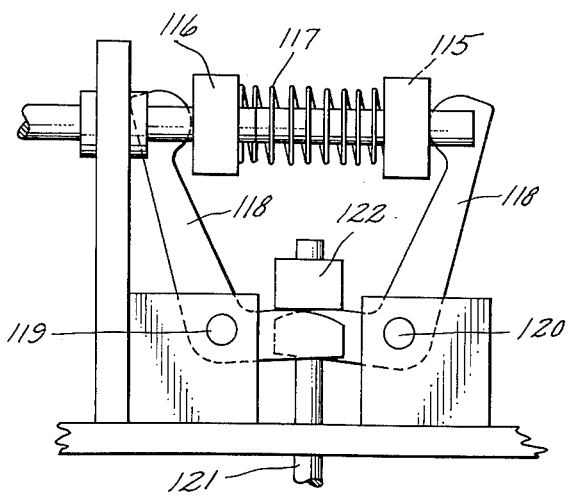
FIGURE 13 is an enlarged view of the squeezing mechanism for shifting the various bars on which the movable jaws are clamped.

Looking at FIGURES 9 and 10, the rods 110 and 111 are joined together at their right-hand ends by a plate member 115. Similarly, rods 112 and 113 are connected together by a plate member 116. These plate members 115 and 116 are shown biased apart by a pair of coiled springs 117. It is necessary to move the plates 115 and 116 toward and away from each other in order to control the operation of the movable jaws 105 of the expansible chutes 100. As seen in FIGURE 13, a pair of bell crank levers 118 are pivotally mounted at 119 and 120 to a fixed structural member on the top plate of the machine. A reciprocating rod 121 is driven by a double throw cam for operating the levers 118. The end of the rod 121 contains an enlarged block 122 that overlies the ends of both of the levers 118. Hence, as the rod 121 moves downwardly, the bell crank levers will pivot toward each other, thereby squeezing the plates 115 and 116 together against the action of the springs 117, to open the jaws as illustrated in FIGURE 10. When the rod 121 is raised, the bell crank levers 118 will tend to move apart, thereby allowing the springs 117 to force the plates 115 and 116 apart, to close the jaws 105 of the expansible chutes 100.

In the plan views of FIGURES 9 and 10 are shown a group of deflectors 123 which underlie the entrance to each tube 21 to catch any cap which might have fallen from the classification center 90. These deflectors steer the caps toward the right of FIGURES 9 and 10 where the caps are discharged into the overflow chute 124, as seen in FIGURE 8. There will be caps falling from the classification center if the tubes 21 are filled up due to a stoppage within a tube or if a cap has turned sidewise on one of the tines, as mentioned previously.

*Orienting Apparatus*

Turning to a consideration of the fragmentary view of FIGURE 14, a device is shown for orienting the push rods 14 so that they may be fed into the inclined slides 20. This device, that has been referred to earlier as an orientating apparatus 94, has a container or bin 131 with a sloping floor 132 that is inclined downwardly toward a side wall 133. Only a portion of this bin is shown but it should not be difficult to visualize the entire apparatus since it is merely a duplication of six systems for feeding the rods into the six slides 20. A plurality of rectangular openings 134 are formed through the floor of the bin so that one end of each opening is adjacent the side wall 133. These openings 134 are arranged parallel to each other and are divised from each other by a raised separator 135 of semi-cylindrical shape. The purpose of the separator 135 is to pile up the push rods 14 over the openings 134. Disposed within each opening 134 is a vertically reciprocating plunger 136 which has an inclined top edge 137 that is arranged parallel to the inclined floor 132. This top edge 137 of the plunger is slotted longitudinally as at 138 to receive the shank portion 16 of the push rods. A jumble of push rods 14 will overlie the plunger 136. As the plunger is raised out of the inclined floor 132, there is the likelihood that the plunger will pick up one or more of the push rods as is shown by the dotted lines at 130. The side wall 133 includes a keyhole slot 139 for each plunger 136. Hence, the plunger is raised until the slot 138 in the top edge of the plunger is aligned with the keyhole slot 139 in the side wall. The plunger remains in this position until the push rods in the plunger slide by gravity through the keyhole slot and into the slide 20. A compressed air pipe 140 is positioned just outside of the side wall 133. This pipe 140 includes an orifice 141 for each keyhole slot to send a blast of air through the slot to circulate the push rods in the bin and increase the possibility of the push rods falling into the slot 138 of the plunger 136.

It is deemed of primary importance to insure that the air cylinder 27 will advance the unassembled bases by one position after each complete cycle of the machine. This means that the completed base in the assembly area 10 must be removed and replaced by an unassembled base. Looking at FIGURE 7 it is clear that the track 12 extends completely through the assembly area. Hence, to remove a completed base it is merely necessary to withdraw the slide member 80 and slide the bases along the track by one position. A micro-switch 150 is arranged at the end of the track and it has a wiper blade 151 that is pivoted out of the way as a completed base is pushed off the end of the track. As the base falls from the track the wiper blade will return to its at-rest position shown in FIGURE 7. If the completed base in the assembly area has not been pushed out of the area a base will not be pushed off the end of the track. In the situation the wiper blade will be held open and the machine will shut off automatically. This is necessary so the carrier will not continue to operate several times on the same base.

Figure 15:
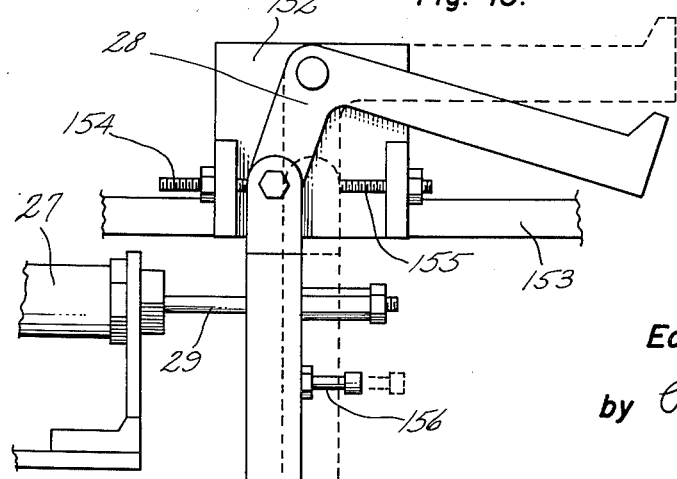
FIGURE 15 is a diagrammatic showing of the air cylinder-operated feeding mechanism for the switch bases.

Turning now to FIGURE 15, and also FIGURE 1, consideration will be given to the drive means for the bases along the track 12. There is an air cylinder 27 with a piston rod 29 that is pivotally connected to the lower end of the bell crank lever 28. This lever is pivotally supported on a sliding frame 152 that straddles a thin rod 153. This lever 28 acts in the manner of a pawl to push the unassembled bases toward the assembly area after the machine has completed a full cycle. The lever 28 is shown in full lines in a lowered position so that the lever will be disengaged from the bases and the frame 152 may be pulled back to the position shown. Two adjustable stops 154 and 155 are arranged on the frame to allow the lever to pivot a prescribed amount. These stops also afford lost motion between the piston rod 29 and lever 28 so that the lever will pivot first before the frame shifts along the rod 153.

The free end of the piston rod also has an adjustable pointer 156 which is adapted to operate a microswitch 157 as the piston rod reaches the end of its outward stroke. This switch 157 sets the carrier assembly in motion again and reinstitutes the cycle.

In general terms the machine operates in the following manner. First, the air cylinder 27 moves the unassembled bases 11 toward the assembly area 10 by one position. One of the bases is clamped in the assembly area. Simultaneously the plunger 48 will carry one of the push rods 14 into the waiting jaws of each pair of tongs 45. As the piston rod 29 of the air cylinder reaches the end of its outward stroke, the switch 157 will start the cycle of the machine. The bar 44 moves downwardly so the carrier 42 will first clamp around the push rods and then insert the rods into the slots 18 in the base and into mating engagement with the caps 19. As these operations are taking place, the plungers 31 have operated twice within the hopper 30, the classification center 90 has also operated twice and the orienting apparatus 94 has also operated twice. The vibratory hopper 91 continuously feeds the push rods down the chute 93 as long as the machine is operating.

Modifications of this invention will occur to those skilled in this art and it is to be understood, therefore, that this invention is not limited to the particular embodiments disclosed but that it is intended to cover all modifications within the true spirit and scope of this invention as claimed.

What I claim as new and desire to secure by Letters Patent of the United States is:

1. An automatic assembly machine for the push rods of a multiple electrical switch, the switch having a recessed base of insulating material, one wall of the base having a series of parallel openings, a metal push rod for each opening, the innermost end of each push rod being larger than its opening so that the rod may not be lifted out of the base through the opening, the outermost end of each push rod being adapted to fit into a plastic cap, said machine comprising a track for feeding switch bases into an assembly area, a vertically movable carrier overlying said assembly area for receiving a plurality of push rods, means for feeding a plurality of caps into said assembly area under the bases, means for lowering the carrier to insert the rods through the openings in the base and into mating engagement with the caps, and means for disengaging the rods from the carrier and returning the carrier to its starting position.

2. An automatic assembly machine for the push rods of a multiple electrical switch, the switch having a recessed base, a series of parallel openings in one wall of the base and a thin metal push rod that is adapted to be held within each opening, the innermost end of each rod being enlarged so that it may not pass through the opening, while the outermost end of the rod is adapted to be fitted with a cap member; the invention comprising a track for feeding the switch bases in close succession into an assembly area, a plurality of chutes for feeding a plurality of push rods and caps into the assembly area transversely of the bases, said chutes being disposed relative to the assembly area so that the push rods are fed to the side of the base having the recess while the caps are fed to the opposite side of the switch base and aligned with respect to the said openings in one wall of the base, transfer means for moving a plurality of push rods from one of said chutes into a position where they may be gripped by a carrier member, gripping means on the carrier for grasping the enlarged end of each push rod, means for lowering the carrier to insert the rods through the openings in the base and into mating engagement with the underlying caps, and means for releasing the grip of the carrier on the push rods and for returning the carrier to its starting position.

3. An automatic asembly machine for the push rods of a multiple electrical switch, the switch having a recessed base with the bottom wall of the recess containing a series of openings for receiving the push rods therethrough, and a cap adapted to fit over the outermost end of each push rod; the invention comprising a track, positive means for feeding the switch bases along said track in close succession through an assembly area, chutes for feeding the push rods and the caps both in a direction transverse to the direction of movement of the bases, said chutes being arranged so that the push rods are fed toward the assembly area on the recessed side of the bases while the caps are fed toward the assembly area on the opposite side of the bases nearest the series of openings, a gravity feed for moving the caps into a position in alignment with the openings in the base, and a mechanical feed for moving the push rods into a position in alignment with the openings in the switch base where a carrier member may grip and support the push rods after which the mechanical feed for the rods is retracted, and means for moving the carrier toward the base so that the rods will extend through the openings of the base and into mating engagement with the caps, and means for withdrawing the grip of the carrier on the rods and returning it to a starting position.

4. An assembly machine as recited in claim 3 wherein the positive feeding means for the switch bases comprises a reciprocating drive rod that is pivoted to one end of a pawl so that in one direction of movement of the drive rod the pawl will be raised first to engage one of the switch bases before the pawl will shift the base toward the assembly area, while the retraction of the drive rod will lower the pawl first before the pawl starts to return to its normal at-rest position.

5. An assembly machine as recited in claim 4 wherein the switch bases move through the machine on a track, a switch mounted at the discharge end of the track, the switch having an actuator that extends into the line of movement of the completed switch bases, the actuator being shifted to the side as a base is being driven off of the track, whereby the machine will shut down automatically if the base does not leave the track thereby insuring that the assembly area must be cleared of the completed base and supplied with an unassembled base before the machine is allowed to repeat its cycle.

6. An apparatus for assembling the push rods in a multiple push button switch, the switch having a recessed base where the bottom wall of the recess has a series of openings for receiving the push rods, the innermost end of each push rod being enlarged so that it may not slip through the opening, while the outermost end of each push rod is adapted to mate with a cap member, the push rod being assembled to the base when the cap is fitted onto the rod, a downwardly sloping track, a positive feed for moving the switch bases along said track for positioning a base in an assembly area where the base will be clamped in position and the push rods inserted through the openings of the base and into mating engagement with the caps, a gravity feed for the caps including a series of sloping tubes which feed the caps under the base to be assembled and into alignment with the openings in the base, a gravity feed for the push rods including the series of slides, mechanism for stopping the push rods short before they are positioned over the base in order to allow freedom of movement of a vertically reciprocating carrier member that overlies the base in the assembly area, and mechanical feed means for feeding a push rod from each of the slides and moving the rods into a position where they may be gripped by the carrier member, mechanism for gripping the enlarged ends of the rods and for removing the mechanical feed means for the rods, mechanism for lowering the carrier thereby dropping the rods through the openings in the base and into mating engagement with the underlying caps, the grip of the rods by the carrier means being removed automatically once the rods are in place, and mechanism for raising the carrier to its starting position and ejecting the assembled base by moving another unassembled base into its place.

7. In an apparatus as recited in claim 6 wherein the carrier supports a plurality of tongs which are adapted to grip the enlarged ends of the push rods to drive them through the openings in the base for mating engagement with the caps, mechanism for locking the tongs shut during the descent of the carrier comprising an upper bar that carries a plurality of wedges, the bar being movable toward the carrier so that the wedges will separate the pivoted members of the tongs and prevent the tongs from releasing the rods, mechanism for locking the upper bar against the carrier so that they move in unison as the carrier moves toward the base, automatic means for unlocking the upper bar when the carrier reaches the bottom of its stroke so that the upper bar may rise first to lift the wedges out of the tongs to open the tongs, and lost motion mechanism on the upper bar for engaging the carrier and lifting it to its top position after the rods have been released.

8. An assembly machine for fastening the push rods and caps in the base of a multiple push button switch comprising a carrier mounted at its opposite ends on a pair of upright posts, the carrier supporting a plurality of pairs of gripping jaws for clamping over a plurality of the push rods, an upper bar also mounted on the posts but spaced above the carrier to provide lost motion between said bar and said carrier, said bar carrying a plurality of locking members cooperating with the mechanism of said jaws to close the jaws of the carrier about said push rods when the bar is lowered, and mechanism for locking the bar against the carrier once they engage each other so that they will move in unison to insert the push rods into the switch base.

9. An assembly machine as recited in claim 8 wherein the upper bar is automatically unlocked from the carrier when they reach the bottom of their stroke, the upper bar including a pair of depending rods that are supported from the underside thereof and are slideably engaged by the carrier, said rods including a collar on the lower end thereof for a lost motion action, so that when the bar is raised from its lowermost position the carrier will not move at first until the collars of the rods move up to engage the underside of the carrier, this lost motion action serving to disengage the locking members of the upper bar from engagement with the gripping jaws on the carrier to release the hold on the push rods.

10. An assembly machine as recited in claim 9 wherein a vertical stud is arranged beside each upright post, each stud extending through an opening in an end of the carrier and having an upper and a lower annular groove, each carrier opening having a spring-biased detent pin that is engageable within the grooves to hold the carrier temporarily in place at both its upper and lower extreme positions during the lost motion periods and until the upper bar is brought into direct driving engagement with the carrier.

11. In an automatic assembly machine for manufacturing electrical switches of the multiple push button type, the switches having a recessed base of insulating material, one wall of the base having a series of parallel openings therein, a metal push rod for each opening, the innermost end of each push rod being enlarged so that the push rod may not pass through the opening, the outermost end of each push rod being adapted to fit into a plastic cap member; the invention comprising means for orienting the push rods and feeding them in multiple files to an assembly area so that they are all in similar relative positions, means for loading a plurality of oriented push rods into a vertically movable carrier overlying a base positioned in the assembly area, means for orienting recessed cap members so that they stand upright, means for feeding a plurality of oriented cap members in multiple files underneath said base, means for lowering the carrier toward said base to insert the oriented rods through the openings in the base and into mating engagement with oriented caps, and means for disengaging the rods from the carrier and returning the carrier to its starting position.

References Cited in the file of this patent

UNITED STATES PATENTS

| | | |
|---|---|---|
| 1,941,992 | McKenny | Jan. 2, 1934 |
| 1,944,360 | Meyer | Jan. 23, 1934 |
| 2,545,756 | Andren | Mar. 20, 1951 |
| 2,570,903 | Yost | Oct. 9, 1951 |
| 2,623,803 | Gamble | Dec. 30, 1952 |
| 2,637,798 | Burge | May 5, 1953 |
| 2,672,837 | Maher | Mar. 23, 1954 |
| 2,714,761 | Wampole | Aug. 9, 1955 |
| 2,823,830 | Kreidler | Feb. 18, 1958 |
| 2,873,883 | Schweiter | Feb. 17, 1959 |